United States Patent Office.

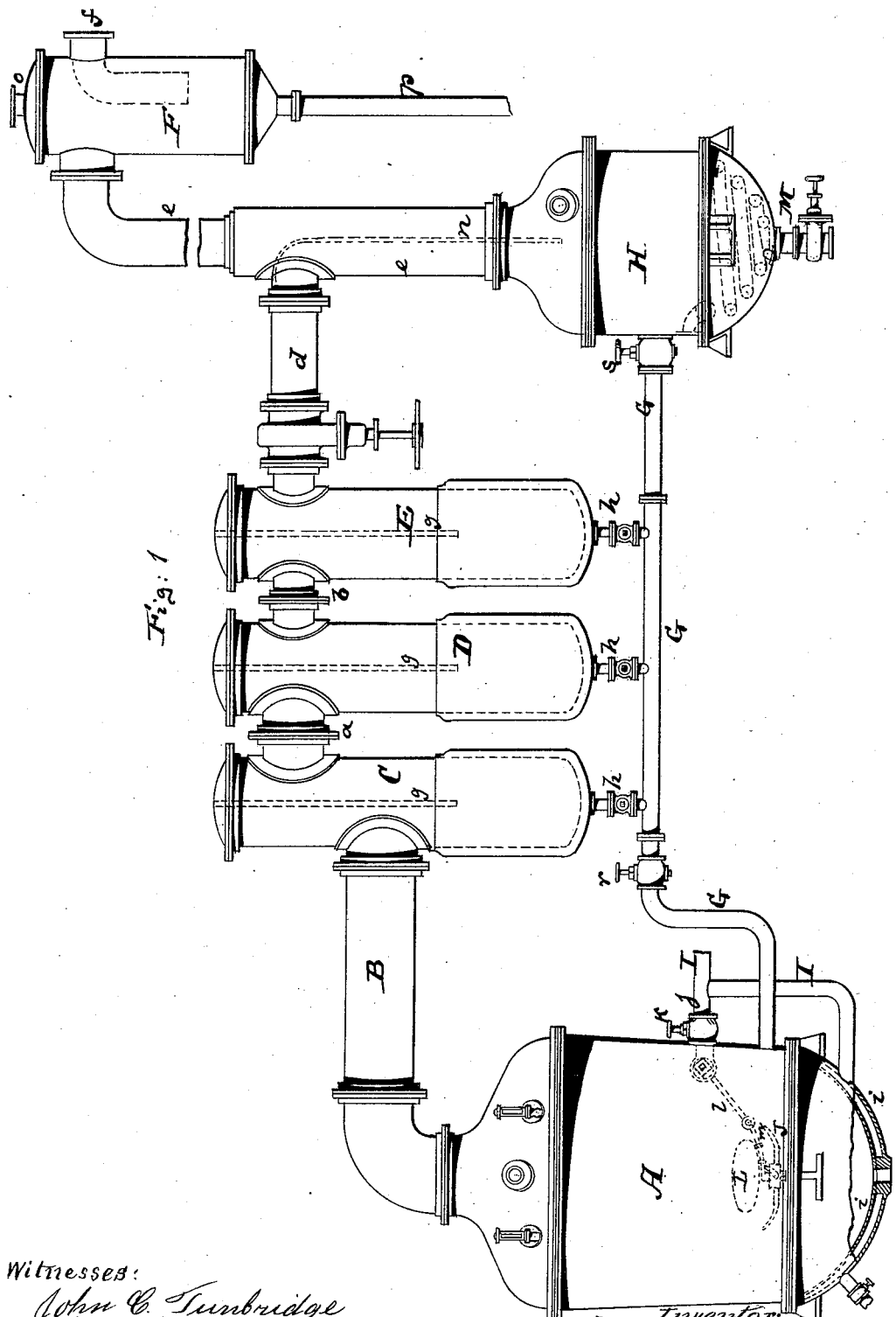

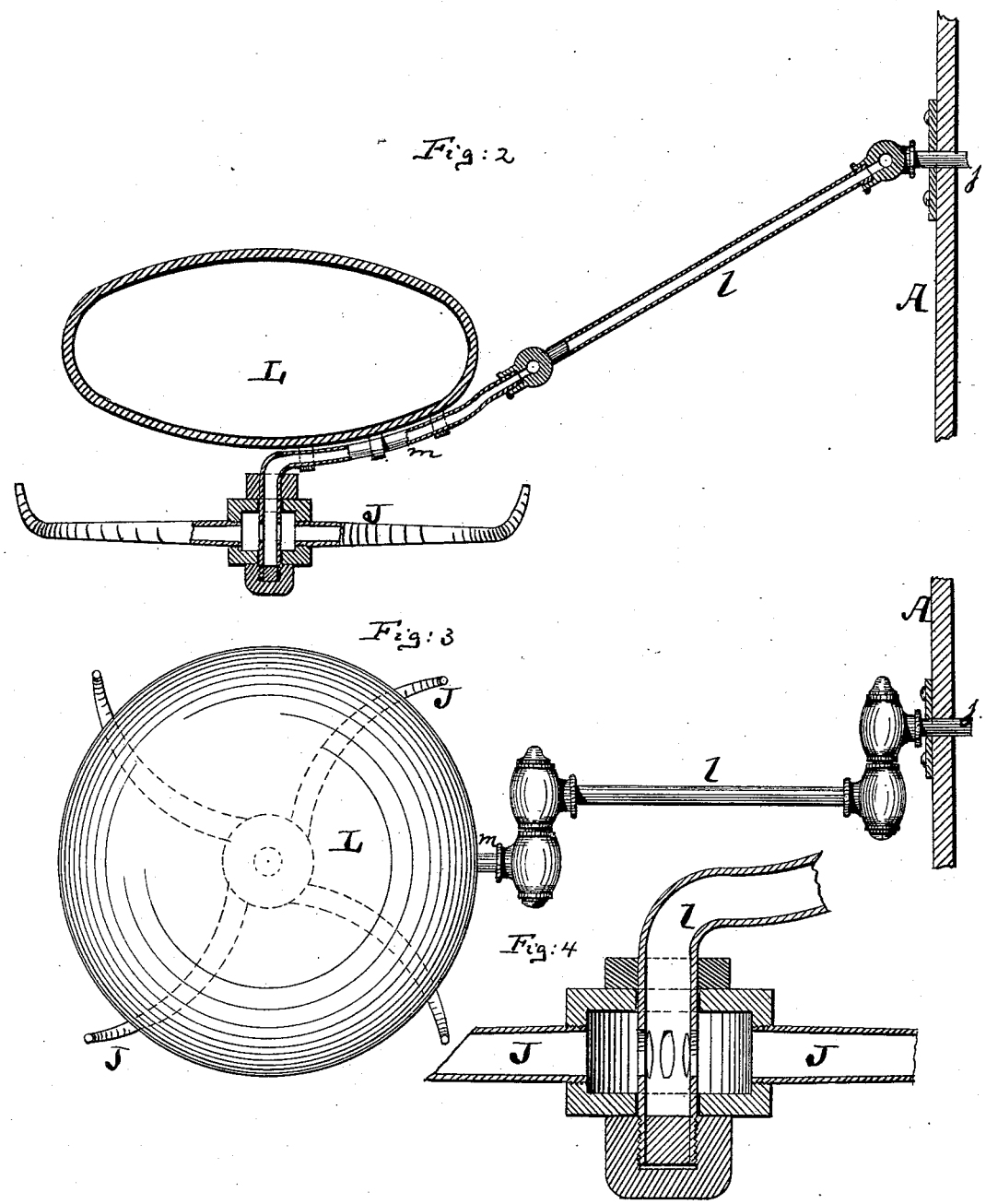

FRANK H. HOUGHTON, OF NEW YORK, N. Y., ASSIGNOR TO JESSE P. BATTER-SHALL, OF SAME PLACE.

PROCESS OF AND APPARATUS FOR PURIFYING GLYCERINE.

SPECIFICATION forming part of Letters Patent No. 306,832, dated October 21, 1884.

Application filed July 28, 1884. (No model.)

*To all whom it may concern:*

Be it known that I, FRANK H. HOUGHTON, of New York, county and State of New York, have invented an Improvement in Process of and Apparatus for Purifying Glycerine and other Substances, of which the following is a complete specification, reference being had to the accompanying drawings, in which—

Figure 1 represents the side elevation, partly in sections, of my improved apparatus. Fig. 2 is an enlarged sectional view of the float which is used in the still. Fig. 3 is a top view of said float, and Fig. 4 is a detailed sectional view on a still larger scale of the swivel for the jet-wheel.

This invention relates to a new apparatus for purifying glycerine and other substances with the aid of a vacuum.

The invention consists, principally, in combining a still which receives the impure glycerine or other substance with apparatus for supplying steam to such still with a system of condensers in which are collected condensed vapors that have escaped from the still, and with an evaporator in which all the products of condensation are finally freed from aqueous or other objectionable constituents.

The invention also consists in other details of improvements, which are hereinafter fully specified.

In the accompanying drawings, letter A represents a still, which discharges by a pipe, B, into condensers C D E, that are united near the upper ends by pipes $a\,b$, and finally discharge from the last of their series by pipe $d$ and stand-pipe $e$ into a vessel, F, which communicates by the pipe $f$ with a suitable vacuum-pump. This vacuum-pump is not represented in the drawings, but may be of suitable construction. There are three condensers, C D E, represented in the drawings, but any suitable greater or less number of such condensers may be employed. The condensers may be of the construction indicated in Fig. 1—that is to say, each provided with a central upright partition, $g$, that reaches from the top downward near, but not quite to, contact with the bottom, so that the vapors escaping from the still will have to pass around the lower end of such partition before they can reach the discharge-pipe near the upper end of the condenser, but any other construction of condenser may be substituted for that shown. The lower end of each condenser connects by pipe $h$ with a pipe, G, one end of which leads into the still A, while its other end leads into a vessel, H, which I style the "evaporator," and from the upper end of which the stand-pipe $e$, heretofore referred to, projects. The still A has a double bottom, $i$, which communicates with a steam supply-pipe, I, for the purpose of heating the contents of such still. A branch, $j$, of the pipe I, having a cock, $k$, leads into the body of the still and communicates by jointed sections of pipe $l\,m$ (see Figs. 2 and 3) with the hub of a jet-wheel, J, which jet-wheel is suspended from the vertical portion of the pipe $m$. The said jet-wheel has four (more or less) radially projecting tubular wings, which are indicated in Fig. 3, and serves to discharge through the said wings jets of steam into the still, it being revolved by the centrifugal force of the steam that passes through said wings. The pipe-section $m$ also carries a float, L, for purposes hereinafter described. The stand-pipe $e$ contains a downwardly-extending partition, $n$, which reaches to the upper portion of the evaporator H, as is indicated in Fig. 1, and which has for its object to carry the vapors that escape from the last condenser, E, downwardly into the evaporator, allowing them finally to travel upward to the vessel F. The evaporator H contains in its lower portion a steam-coil, M, by means of which its contents are heated. The vessel F communicates at its upper portion by a neck, $o$, with a suitable water-supply, through which water is sprinkled into said vessel. The said vessel F also has a downwardly-extending pipe, $p$, which, in case the air-pump is attached to the pipe $f$, should be a barometrical tube of about thirty-five feet length, but which may also have the air-pump directly attached to it, in which case it need not be so long.

The apparatus described operates as follows: The glycerine or other substance to be purified is put into the still A. The float L will be supported on the level of the contents of said still, so that the jet-wheel J will just dip into such contents. Steam is now introduced through the pipe I and branch $j$ so as to heat the contents of the still and also introduce steam directly into the still through the wings of the jet-wheel. At the same time the vacuum-pump is put in operation. The vapors arising from the contents of the still will pass through the neck B into the condensers C D E, and whatever is condensed in the latter flows either through the pipes $h$ into the pipe G, and thence into the evaporator H, (the cock $r$, which is placed in the pipe G near the still A, being closed,) or such condensed matter may be retained for the time being in the condensers. The jet-wheel J in the still revolves in the upper stratum of the liquid contents of such still and agitates its upper stratum, assisting materially in evaporating the same, and, confining its labor to the upper stratum, prevents the lower strata of the contents from being agitated and from disturbing the proper operation of the still. In other words, by the arrangement of the jet-wheel I confine the evaporating action of the still to the upper stratum of the contents of the still, leaving the lower strata to be first heated by the steam-jacket, so that they will be prepared for distillation by the time they become the upper stratum. The float L being supported on the liquid contents of the still follows the surface thereof as they become reduced or enhanced within the body of the still. The proper temperature for the contents of the still to be produced by the action of the steam is about 350° Fahrenheit. If, however, from some cause the temperature should be greater and the contents of the still should be flashed out through the neck B into the condensers without having been properly evaporated at first, then in that case the cock $r$ is opened and another cock, $s$, in the pipe G near the evaporator H closed, so as to allow the contents of the condensers to flow back into the body of the still. Whenever the still operates normally, the cock $r$ is closed. The vapors, after having left the products of condensation in the condensers, pass out through the pipes $d$ $e$ into the upper part of the evaporator, and finally through the pipe $e$ into the vessel F. In this latter-named vessel they are sprinkled with water through the neck $o$ of the vessel F, and are finally condensed into water, which escapes through the pipe $p$; but if the air-pump should be attached to the pipe $p$ all these vapors are simply drawn through the air-pump and finally discharged by the same. Whenever the condensers have accumulated sufficient liquid matter in the lower parts, the pipes $h$ are opened so as to allow the liquid contents of the condensers to flow through the pipe G past the now opened cock $s$ into the evaporator H. This evaporator is, by the steam-coil M, or by analogous other means, heated to about 175° Fahrenheit, and serves to evaporate the water or other objectionable impurity which may have remained with the condensed glycerine or other substance in the lower parts of the condensers, leaving the pure glycerine free from all objectionable impurities. The temperature in the evaporator will, of course, vary according to the substance to be treated. Glycerine will not evaporate at 175° Fahrenheit; water will; hence the degree of temperature mentioned is well adapted to the treatment of glycerine; but for other substances, which may also be treated with equal advantage in this apparatus, the degree of temperature may of course be varied both in the evaporator and in the still.

I claim—

1. In an apparatus for purifying glycerine and other substances, the combination of the still A, and means for heating its contents, with the condensers C D E, the evaporator H, and with an air-pump, substantially as described.

2. The combination of the still A, with means, substantially as described, for heating its contents, with the condensers C D E, evaporator H, air pump, and pipe G, which connects the condensers with the evaporator, substantially as herein shown and described.

3. The still A, combined with the condensers C D E, and with the pipe G, which communicates with said condensers, and which leads back into the still, substantially as described.

4. The combination of the still A with the condensers C D E, pipes $d$ $e$, vessel F, evaporator H, and pipe G, said pipe G communicating with the still, the condensers, and the evaporator, as specified.

5. In a still, the combination of the float L with the jointed steam-pipes $l$ $m$, and rotary jet-wheel J, as described.

6. The process herein described of purifying glycerine and other substances, which process consists in first evaporating the impure substance in a still, then passing the vapors through condensers, and finally evaporating the water or other objectionable product of condensation from the product of condensation in an evaporator, all in the presence of a vacuum, substantially as herein specified.

FRANK H. HOUGHTON.

Witnesses:
JAMES H. MACPHAIL, Jr.,
ARTHUR V. BRIESEN.